(12) United States Patent
      Lin

(10) Patent No.: US 12,593,098 B2
(45) Date of Patent: Mar. 31, 2026

(54) SMART DEVICE AND DISPLAY CONTROL SYSTEM

(71) Applicant: Realtek Semiconductor Corporation, Hsinchu (TW)

(72) Inventor: Tzuo-Bo Lin, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 17 days.

(21) Appl. No.: 18/650,092

(22) Filed: Apr. 30, 2024

(65) Prior Publication Data

US 2024/0380940 A1     Nov. 14, 2024

Related U.S. Application Data

(60) Provisional application No. 63/500,906, filed on May 8, 2023.

(30) Foreign Application Priority Data

Oct. 26, 2023    (TW) .................................. 112141115

(51) Int. Cl.

| | |
|---|---|
| *H04N 21/436* | (2011.01) |
| *H04N 21/41* | (2011.01) |
| *H04N 21/422* | (2011.01) |
| *H04N 21/4363* | (2011.01) |
| *H04N 21/485* | (2011.01) |

(52) U.S. Cl.
    CPC . *H04N 21/43635* (2013.01); *H04N 21/41265* (2020.08); *H04N 21/42206* (2013.01); *H04N 21/485* (2013.01)

(58) Field of Classification Search
    None
    See application file for complete search history.

(56) References Cited

U.S. PATENT DOCUMENTS

| | | | | |
|---|---|---|---|---|
| 10,964,203 | B1 * | 3/2021 | Fiaux ............... | H04N 21/43635 |
| 2006/0269056 | A1 | 11/2006 | Montag | |
| 2009/0046999 | A1 | 2/2009 | Park | |
| 2009/0162029 | A1 | 6/2009 | Glen | |
| 2009/0207307 | A1 | 8/2009 | Tsuru et al. | |
| 2010/0214212 | A1 | 8/2010 | Chen et al. | |

(Continued)

FOREIGN PATENT DOCUMENTS

| | | |
|---|---|---|
| CN | 102024444 A | 4/2011 |
| CN | 104040478 B | 11/2017 |

(Continued)

*Primary Examiner* — Omar S Parra
(74) *Attorney, Agent, or Firm* — CKC & Partners Co., LLC

(57) ABSTRACT

A display control system includes a remote control device and a smart device. The remote control device transmits a control command. The smart device is paired with the remote control device to receive the control command. The smart device transmits a display control command to a display device according to the control command, thereby adjusting a display parameter of the display device. The smart device is connected to the display device through a high definition multimedia interface (HDMI). The smart device transmits the display control command to the display device through the HDMI and a Display Data Channel (DDC) and in compliance with a Video Electronics Standards Association (VESA) Monitor Control Command Set (MCCS) standard.

20 Claims, 3 Drawing Sheets

(56) References Cited

U.S. PATENT DOCUMENTS

| | | | |
|---|---|---|---|
| 2010/0245367 A1 | 9/2010 | Weng et al. | |
| 2013/0285894 A1 | 10/2013 | Marti | |
| 2014/0009501 A1 | 1/2014 | Kim et al. | |
| 2014/0222862 A1* | 8/2014 | Arling .................... | G08C 17/02 |
| | | | 707/769 |
| 2017/0010654 A1 | 1/2017 | Chen | |
| 2017/0257668 A1 | 9/2017 | Kim, II et al. | |
| 2018/0091845 A1 | 3/2018 | Lee et al. | |
| 2018/0173592 A1 | 6/2018 | Heo et al. | |
| 2019/0155364 A1 | 5/2019 | Chen | |
| 2021/0388979 A1 | 12/2021 | Maderic | |
| 2021/0392301 A1* | 12/2021 | Tong ............... | H04N 21/43635 |
| 2022/0400302 A1* | 12/2022 | Baker .............. | H04N 21/25875 |
| 2023/0176852 A1 | 6/2023 | Senda | |
| 2024/0146996 A1 | 5/2024 | Shao et al. | |
| 2025/0021290 A1 | 1/2025 | Jeong et al. | |

FOREIGN PATENT DOCUMENTS

| | | | |
|---|---|---|---|
| CN | 114968314 A | 8/2022 | |
| CN | 116887382 A | 10/2023 | |
| TW | 201338328 A | 9/2013 | |
| TW | 201613360 A | 4/2016 | |
| TW | 201902228 A | 1/2019 | |
| TW | 202209091 A | 3/2022 | |
| TW | 202318187 A | 5/2023 | |

* cited by examiner

SMART DEVICE AND DISPLAY CONTROL SYSTEM

RELATED APPLICATIONS

This application claims priority to U.S. Provisional Application Ser. No. 63/500,906, filed May 8, 2023, and Taiwan Application Serial Number 112141115, filed Oct. 26, 2023, the disclosures of which are incorporated herein by reference in their entireties.

BACKGROUND

Field of Invention

The present invention relates to a smart device. More particularly, the present invention relates to a display device and a display control system.

Description of Related Art

Currently, the display parameter of the display device, such as brightness, contrast, volume, etc., is adjusted by manually pressing the physical button disposed on the frame of the display device, such that the display device displays shows the On-Screen Display (OSD) menu on the screen of the display device. The user then selects the corresponding items within the OSD menu by manually pressing one or more physical buttons disposed on the frame of the display device, thereby completing the adjustment of one display parameter. However, the aforementioned approach requires a considerable number of key pressing operations to complete the adjustment of one display parameter, which is quite cumbersome and time-consuming, thus causing inconvenience in use. Therefore, the existing technology still needs to be improved.

SUMMARY

The present invention provides a display control system. The display control system includes a remote control device and a smart device. The remote control device is configured to transmit a control command. The smart device is paired with the remote control device to receive the control command. The smart device is configured to transmit a display control command to a display device according to the control command, thereby adjusting a display parameter of the display device. The smart device is connected to the display device through a high definition multimedia interface (HDMI). The smart device transmits the display control command to the display device through the HDMI and a Display Data Channel (DDC) and in compliance with a Video Electronics Standards Association (VESA) Monitor Control Command Set (MCCS) standard.

The present invention further provides a display control system. The display control system includes a remote control device and a smart device. The remote control device is configured to transmit a control command. The smart device is paired with the remote control device to receive the control command. The smart device includes a processor, an audio-video output interface circuit, and a first connector. The processer is configured to convert the control command to a display control command and to transmit the display control command to a display device. The audio-video output interface circuit is configured to output an audio-video data to the display device. The first connector is physically connected to a second connector of the display device. An OSD circuit of the display device is configured to adjust a display parameter of the display device according to the display control command. A blending circuit of the display device is configured to obtain a blended audio-video data according to the display control command and according to the audio-video data and the adjusted display parameter, thereby displaying the blended audio-video on a screen of the display device accordingly.

The present invention yet provides a smart device. The smart device includes an input/output (I/O) interface controller, a processor, and a first connector. The I/O interface controller is configured to receive a first control command from a remote control device. The processor is configured to convert the first control command to a first display control command and to transmit the first display control command to a display device, thereby adjusting a display parameter of the display device accordingly. The first connector is physically connected to a second connector of the display device. The smart device is a digital video converting box with internet networking capabilities, and the digital video converting box is a Set-Top Box (STB).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present invention are further described in detail below with reference to the accompanying drawings, however, the embodiments described are not intended to limit the present invention and it is not intended for the description of operation to limit the order of implementation. The using of "first", "second", "third", etc. in the specification should be understood for identify units or data described by the same terminology, but are not referred to particular order or sequence.

Figure 1:
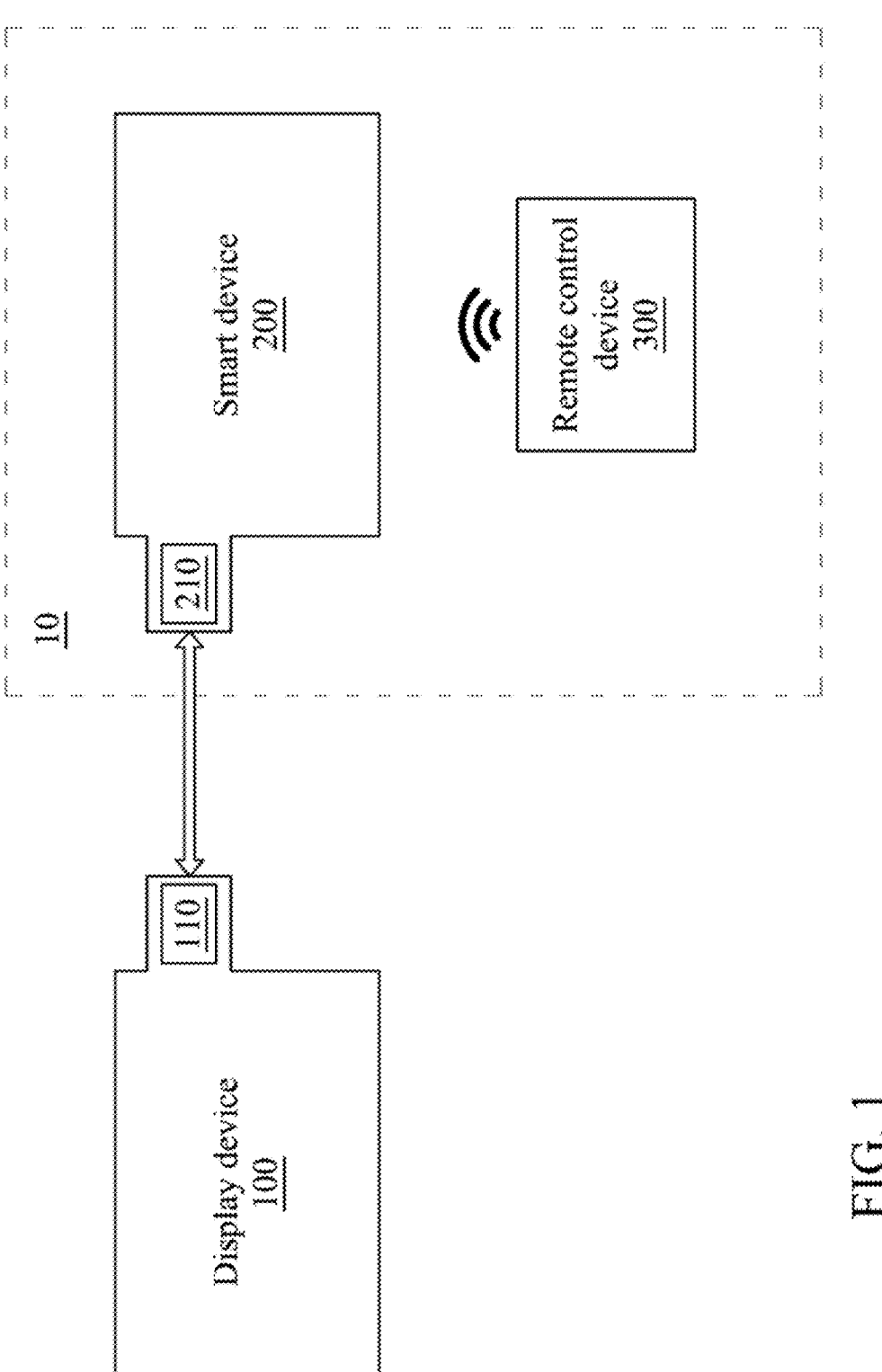
FIG. 1 illustrates a system block diagram of a display control system according to some embodiments of the present invention.

FIG. 1 illustrates a system block diagram of a display control system 10 according to some embodiments of the present invention. The display control system 10 includes a smart device 200 and a remote control device 300. The display control system 10 is communicatively connected to the display device 100. In some embodiments of the present invention, the display device 100 may be a monitor or a television having a display screen. In some embodiments of the present invention, the smart device 200 is a digital video converting box (also known as a Set-Top Box (STB)) with internet networking capabilities, such as an OTT set-top box, a TV stick, a dongle, or a smart TV box, etc. The smart device 200 may receive digital audio-video content corresponding to the audio-video data through the internet.

As shown in FIG. 1, the remote control device 300 is communicatively connected to the smart device 200 pairing with the remote control device 300. In other words, the smart device 200 and the remote control device 300 are connected and paired. In some embodiments of the present invention, the remote control device 300 is a mouse, a keyboard, a smart phone or a wireless remote controller, such that the remote control device 300 may manipulate the smart device 200. In some embodiments of the present invention, the remote control device 300 is communicatively connected to the smart device 200 through a transmission interface, such as but not limited to a Bluetooth interface, an infrared (IR) transmission interface, a universal serial bus (USB) interface or a wireless local area network (WLAN) interface. Specifically, in some embodiments of the present invention, the remote control device 300 transmits a control command to the smart device 200 through the said transmission interface.

For example, when the remote control device 300 is the mouse or the keyboard, the remote control device 300 is communicatively connected to the smart device 200 through the Bluetooth interface, the IR transmission interface, or the USB interface. For example, when the remote control device 300 is the smart phone, the remote control device 300 is communicatively connected to the smart device 200 through the Bluetooth interface, the IR transmission interface, the USB interface, or the WLAN interface. For example, when the remote control device 300 is a Bluetooth remote controller, the remote control device 300 is communicatively connected to the smart device 200 through the Bluetooth interface. For example, when the remote control device 300 is an infrared (IR) remote controller, the remote control device 300 is communicatively connected to the smart device 200 through the IR interface. For example, when the remote control device 300 is a Wi-Fi remote controller, the remote control device 300 is communicatively connected to the smart device 200 through the WLAN interface.

As shown in FIG. 1, a connector 110 of the display device 100 is physically connected to a connector 210 of the smart device 200. For example, the connector 210 is a male connector physically connected to the connector 110 which is a female connector in a plug-in manner. For example, the connector 110 is physically connected to the connector 210 through cable interconnection. In some embodiments of the present invention, each of the connector 110 and the connector 210 includes a high definition multimedia interface (HDMI), but the present invention is not limited thereto. In another embodiment of the present invention, each of the connector 110 and the connector 210 includes a DisplayPort (DP) interface. In yet embodiment of the present invention, each of the connector 110 and the connector 210 includes a Universal Serial Bus Type-C (USB-C) interface.

Figure 2:
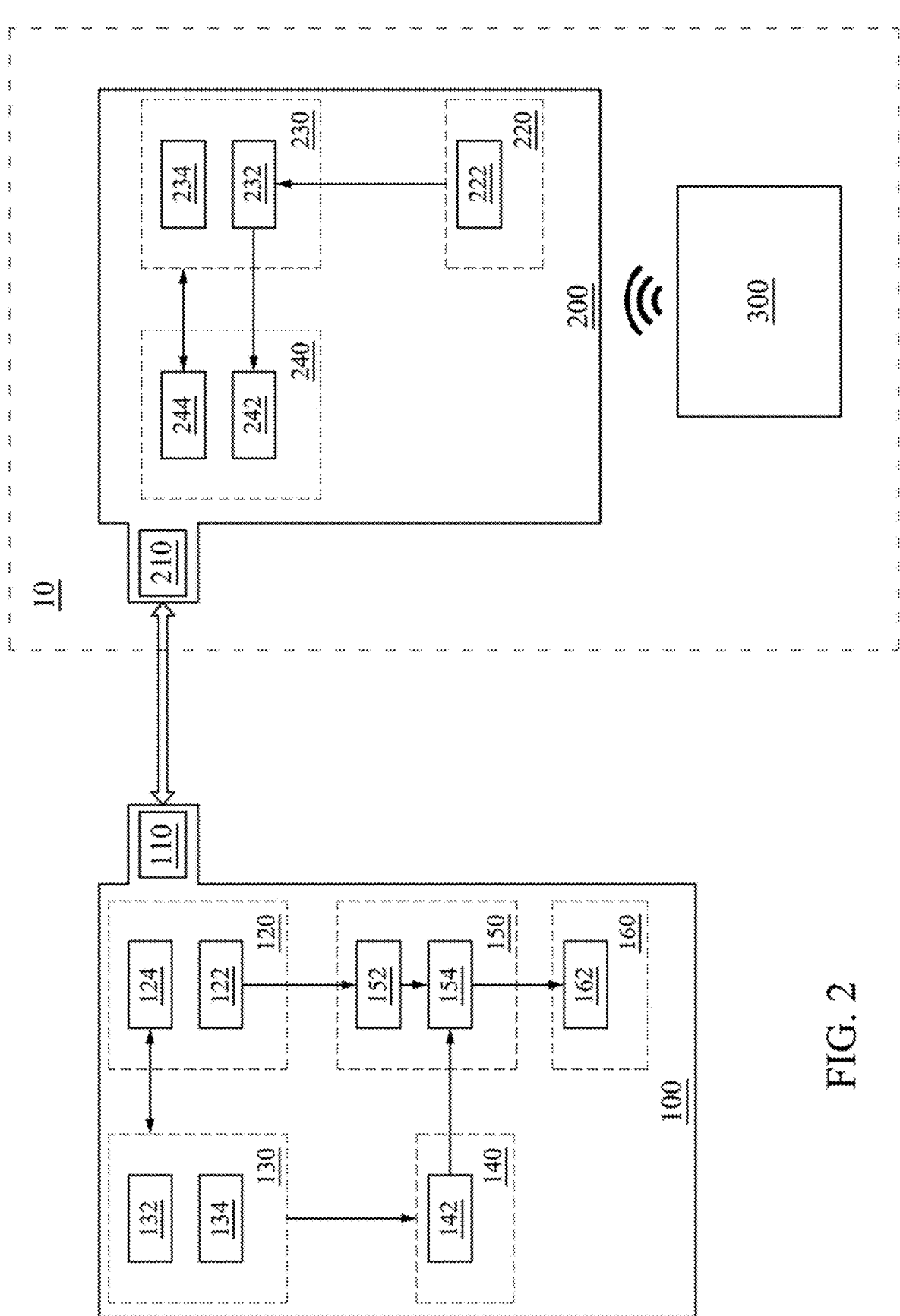
FIG. 2 illustrates a detailed system block diagram of the display control system according to some embodiments of the present invention.

FIG. 2 illustrates a detailed system block diagram of the display control system 10 according to some embodiments of the present invention. As shown in FIG. 2, the smart device 200 includes the connector 210, an input/output (I/O) interface controller 220, a processing circuit 230, and an output circuit 240. The I/O interface controller 220 includes an interface circuit 222. The processing circuit 230 includes a processor 232 and memory 234. The output circuit 240 includes an audio-video output interface circuit 242 and a Monitor Control Command Set (MCCS) circuit 244 (hereinafter referred to as the MCCS command circuit 244).

The interface circuit 222 is used to enable the smart device 200 to be communicatively connected to the remote control device 300, such that the smart device 200 may receive the control command from the remote control device 300.

The processor 232 receives the control command from the interface circuit 222 and the processor 232 is used to convert the control command to the display control command. The processor 232 is also used to convert digital audio-video content (received by the smart device 200 through the internet) to audio-video data. The memory 234 is used to store data related to the smart device 200, such as setting parameters and browsing history of the smart device 200. The memory 234 can also be used to store display parameter(s) (e.g., current brightness, current contrast, current volume, etc.) of the display device 100 read by the smart device 200 (The details will be explained in following paragraphs).

The audio-video output interface circuit 242 is used to receive audio-video data from the processor 232 and to output the audio-video data to the display device 100. The MCCS command circuit 244 is used to receive the display control command from the processor 232 and to transmit the display control command to the display device 100.

As shown in FIG. 2, the display device 100 includes an input circuit 120, a processing circuit 130, an On-Screen Display (OSD) circuit 140, an audio-video processing circuit 150, and an output circuit 160. The input circuit 120 includes an audio-video input interface circuit 122 and a MCCS command circuit 124. The processing circuit 130 includes a processor 132 and a memory 134. The OSD circuit 140 includes an On-Screen Display (OSD) unit 142. The audio-video processing circuit 150 includes an audio-video processor 152 and a blending circuit 154. The output circuit 160 includes an audio-video output circuit 162.

The audio-video input interface circuit 122 is used to receive audio-video data from the audio-video output interface circuit 242. The MCCS command circuit 124 is used to receive the display control command from the MCCS command circuit 244.

The processor 132 is used to receive the display control command from the MCCS command circuit 124 and to perform signal processing on the display control command. The memory 134 is used to store data related to the display device 100, such as display parameter(s).

The OSD unit 142 is used to receive the display control command processed by the processor 132 from the processor 132 and to correspondingly adjust the display parameter(s) of the display device 100 according to the display control command processed by the processor 132.

The audio-video processor 152 is used to receive audio-video data from the audio-video input interface circuit 122 and to process the audio-video data. The blending circuit 154 is used to receive the adjusted display parameter(s) from the OSD unit 142, and to receive the processed audio-video data from the audio-video processor 152, and to blend the processed audio-video data and the adjusted display parameter(s) so as to generate the blended audio-video data. In other words, the blending circuit 154 is used to generate the blended audio-video data according to the adjusted display parameter(s) and the processed audio-video data.

The audio-video output circuit 162 is used to receive the blended audio-video data from the blending circuit 154, such that the blended audio-video data can be displayed on the screen of the display device 100 accordingly.

In some embodiments of the present invention, when each of the connector 110 and the connector 210 includes the high definition multimedia interface (HDMI), the MCCS command circuit 244 transmits the display control command to the MCCS command circuit 124 through the HDMI and a Display Data Channel (DDC). In detail, when each of the connector 110 and the connector 210 includes the HDMI, the smart device 200 transmits the display control command to the display device 100 through the HDMI and the DDC and in compliance with a Video Electronics Standards Association (VESA) Monitor Control Command Set (MCCS) standard. In other words, the display control command transmitted from the smart device 200 to the display device 100 is a MCCS command, and specifically, the processor 232 of the smart device 200 converts the control command to the MCCS command. Specifically, the embodiments of the present invention may actually support any function specified by the MCCS standard. The aforementioned function is to, such as but not limited to, adjust color temperature, saturation, HUE, brightness, contrast, volume, etc. For detailed function, please refer to the "VESA Monitor Control Command Set Standard" documents of the VESA Association.

Specifically, the embodiments of the present invention may transmit the control command to the smart device 200 through the remote control device 300 in a remote control manner, so that the smart device 200 correspondingly transmits the display control command to the display device 100, thereby adjusting the display parameter (e.g., brightness, contrast, volume, etc.) of the display device accordingly. Therefore, the embodiments of the present invention can quickly and simply adjust the display parameter(s) of the display device 100 without the tedious pressing of physical buttons disposed on the frame of the screen of the display device. The present invention can simplify the traditionally tedious and time-consuming physical button pressing process through a manner similar to the one-key adjustment. On the other hand, by utilizing the embodiments of the present invention, the display device does not need to configure the physical buttons thereon, thereby reducing the production cost of the display device.

In some embodiments of the present invention, when each of the connector 110 and the connector 210 includes a DisplayPort (DP) interface, the MCCS command circuit 244 transmits the display control command to the MCCS command circuit 124 through the DP interface and an Auxiliary (AUX) channel. In detail, when each of the connector 110 and the connector 210 includes the DP interface, the smart device 200 transmits the display control command to the display device 100 through the DP interface and the AUX channel and in compliance with the VESA MCCS standard.

In some embodiments of the present invention, when each of the connector 110 and the connector 210 includes a Universal Serial Bus Type-C (USB-C) interface, the MCCS command circuit 244 transmits the display control command to the MCCS command circuit 124 through the USB-C interface and a data channel including differential signal pair (i.e., D+/D−). In detail, when each of the connector 110 and the connector 210 includes the USB-C interface, the smart device 200 transmits the display control command to the display device 100 through the USB-C interface and the data channel including differential signal pair (i.e., D+/D−).

In some embodiments of the present invention, when the display device 100 receives the display control command, the display parameter(s) of the display device 100 is correspondingly adjusted according to the display control command through the OSD unit 142. In addition, by utilizing display control command, one of the following control functions can also be implemented: (A1) displaying the OSD menu on the screen of the display device 100; (A2) not displaying the audio and video data on the screen of the display device 100; (A3) switching an input signal source of the display device 100 to be from the connector 110 or another connector (not shown) (different from the connector 110) of the display device 100.

Regarding (A1) displaying the OSD menu on the screen of the display device 100, the implementation is described as follows. Each of the connector 110 and the connector 210 includes HDMI, and the MCCS command circuit 244 transmits the display control command to the display device 100 through the DDC, thereby realizing the function of displaying the OSD menu.

Regarding (A2) not displaying the audio and video data on the screen of the display device 100, the implementation may include any of the following approaches: (1) controlling the screen of the display device 100 to be switched on/off, (2) controlling the screen of the display device 100 to display an entire black frame or an entire specific color frame, (3) controlling the screen of the display device 100 to display a specific text, a specific text string (such as a warning message) or a specific pattern (such as a brand logo), (4) controlling the screen of the display device 100 to only display the OSD menu and the rest portion of the screen display an entire black frame, (5) controlling the screen of the display device 100 to only normally display for a short period of time (such as a minutes) to facilitate the user to operate the OSD menu, (6) interrupting the audio and video data stream outputted by the smart device 200, or (7) powering off the connector 110 of the display device 100, etc. In other embodiments, the power supply (e.g., HDMI 5V power supply) of the smart device 200 can be disconnected so that the screen of the display device 100 cannot normally display. Alternatively, the backlight unit of the display device 100 may be powered off according to the display control command. Specifically, the MCCS command circuit 244 transmits the display control command to the display device 100 through the DDC and in compliance with the MCCS standard or the Consumer Electronics Control (CEC) protocol, such that the screen of the display device 100 cannot normally display the information corresponding to the audio and video data.

Regarding (A3) switching the input signal source of the display device 100 to be from the connector 110 or another connector of the display device 100, the implementation is described as follows. Each of the connector 110 and the connector 210 includes HDMI, and the MCCS command circuit 244 transmits the display control command to the display device 100 through the DDC, thereby realizing the function of switching the input signal source of the display device 100. In some embodiments of the present invention, the aforementioned another connector of the display device 100 includes the HDMI, the DP interface, or the USB-C interface. Specifically, even if the aforementioned another connector of the display device 100 is already connected to another device, as long as the smart device 200 is not powered off, the input signal source of the display device 100 can be switched by utilizing the smart device 200.

In some embodiments of the present invention, the smart device 200 is further used to correspondingly transmit a display read command to the display device 100 according to a read command transmitted by the remote control device 300, such that the smart device 200 receives the display parameter(s) of the display device 100 from the OSD circuit 140 of the display device 100. In detail, the interface circuit 222 receives the read command from the remote control device 300, and then the processor 232 converts the read command to the display read command, and then the MCCS command circuit 244 transmits the display read command to the display device 100, and then the OSD circuit 140 correspondingly transmits/returns the display parameter(s) of the display device 100 to the smart device 200 according to the display read command, and then the memory 234 stores the display parameter(s) of the display device 100. For example, each of the connector 110 and the connector 210 includes HDMI, and the MCCS command circuit 244 transmits the display read command to the display device 100 through the DDC and in compliance with the MCCS standard, and thus the smart device 200 receives the display parameter(s) of the display device 100 through the DDC. In some embodiments of the present invention, the remote control device 300 is a smart phone. The smart phone receives the display parameter(s) of the display device 100 from the smart device 200. The smart phone executes a corresponding application program (APP), such that the display parameter(s) of the display device 100 can be displayed on the screen of the smart phone, and thus the operator of the smartphone can read/obtain the display parameter(s) of the display device 100.

Figure 3:
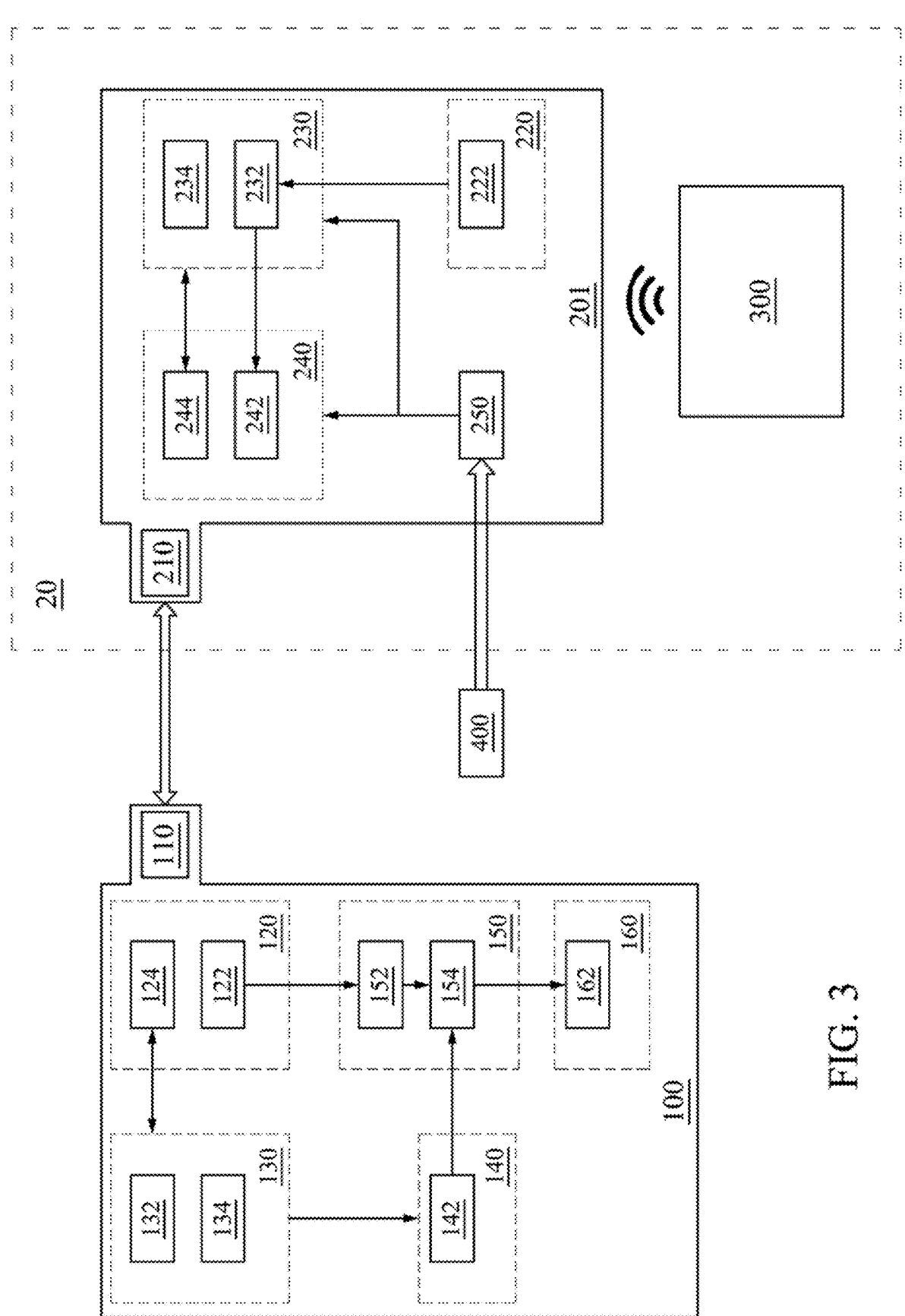
FIG. 3 illustrates a detailed system block diagram of the display control system according to some other embodiments of the present invention.

FIG. 3 illustrates a detailed system block diagram of a display control system 20 according to some other embodiments of the present invention. The display control system 20 of FIG. 3 is similar to the display control system 10. The difference between the display control systems 20 and 10 is that a smart device 201 of the display control system 20 further includes a network interface controller 250. The network interface controller 250 is electrically connected to the processing circuit 230 and the output circuit 240. The network interface controller 250 is further communicatively connected to the external network 400 through the network, such as Ethernet, Fibre channel (FC), wireless local area network (WLAN) interface, Bluetooth interface, Firewire, Internet, etc. Specifically, the smart device 201 of the display control system 20 supports the sleep mode and supports the sideband signal. The aforementioned sideband signal is responsible for the role of the transmission of the network interface controller 250 when the network interface controller 250 receives a Wake-on-LAN (WoL) packet from the external network 400. Therefore, the smart device 201 of the display control system 20 can be woken on LAN, thereby reducing ineffective power consumption.

For example, when the smart device 201 is in the sleep mode and the network interface controller 250 receives the WoL packet from the external network 400, the network interface controller 250 notifies the processing circuit 230 to cause the processing circuit 230 to generate the sideband signal to wake up the smart device 201, such that the smart device 201 enters an operation mode from the sleep mode.

For example, when the display device 100 is in a sleep mode and the network interface controller 250 receives the WoL packet from the external network 400, the network interface controller 250 notifies the processing circuit 230 to cause the processing circuit 230 to generate the sideband signal, and the sideband signal (also called the WoL signal) is transmitted from the output circuit 240 to the display device 100, thereby waking up the display device 100, such that the display device 100 enters an operation mode from the sleep mode.

From the above description, the present invention provides the display control system. The user can control the smart device through the remote control device to adjust the display parameter(s) of the display device without using any physical buttons corresponding to the OSD menu of the display device, which improves the user's convenience in operation and also makes the display device is not required to configured the physical buttons thereon, thereby reducing the production cost of the display device.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display control system, comprising:
a remote control device configured to transmit a control command; and
a smart device paired with the remote control device to receive the control command, wherein the smart device is configured to transmit a display control command to a display device according to the control command, thereby adjusting a display parameter of the display device;
wherein the smart device is connected to the display device through a high definition multimedia interface (HDMI), wherein the smart device transmits the display control command to the display device through the HDMI and a Display Data Channel (DDC) and in compliance with a Video Electronics Standards Association (VESA) Monitor Control Command Set (MCCS) standard.

2. The display control system of claim 1, wherein the smart device is a digital video converting box with internet networking capabilities, wherein the digital video converting box is a Set-Top Box (STB).

3. The display control system of claim 1, wherein the remote control device is a mouse, a keyboard, a smart phone or a wireless remote controller, wherein the remote control device transmits the control command to the smart device through a transmission interface, wherein the transmission interface is a Bluetooth interface, an infrared (IR) transmission interface, a universal serial bus (USB) interface or a wireless local area network (WLAN) interface.

4. The display control system of claim 1, wherein the remote control device is further configured to transmit a read command to the smart device, wherein the smart device is further configured to transmit a display read command to the display device according to the read command, such that the smart device receives the display parameter from an On-Screen Display (OSD) circuit of the display device.

5. The display control system of claim 4, wherein the smart device is further configured to transmit the display read command to the display device through the DDC and in compliance with the VESA MCCS standard.

6. The display control system of claim 4, wherein the remote control device is a smart phone, wherein the smart phone executes a corresponding application program (APP) to display the display parameter on a screen of the smart phone.

7. A display control system, comprising:
a remote control device configured to transmit a control command; and
a smart device paired with the remote control device to receive the control command, wherein the smart device includes:
a processer configured to convert the control command to a display control command and to transmit the display control command to a display device;
an audio-video output interface circuit configured to output an audio-video data to the display device; and a first connector physically connected to a second connector of the display device;

wherein an OSD circuit of the display device is configured to adjust a display parameter of the display device according to the display control command;

wherein a blending circuit of the display device is configured to obtain a blended audio-video data according to the display control command and according to the audio-video data and the adjusted display parameter, thereby displaying the blended audio-video data on a screen of the display device accordingly.

8. The display control system of claim 7, wherein the smart device is a digital video converting box with internet networking capabilities, wherein the digital video converting box is a STB.

9. The display control system of claim 7, wherein the first connector includes an HDMI, wherein the smart device transmits the display control command to the display device through the HDMI and a DDC.

10. The display control system of claim 9, wherein the smart device transmits the display control command to the display device in compliance with a VESA MCCS standard.

11. The display control system of claim 7, wherein the first connector includes a DisplayPort (DP) interface, wherein the smart device transmits the display control command to the display device through the DP interface and an Auxiliary (AUX) channel.

12. The display control system of claim 11, wherein the smart device transmits the display control command to the display device in compliance with a VESA MCCS standard.

13. The display control system of claim 7, wherein the first connector includes a Universal Serial Bus Type-C (USB-C) interface, wherein the smart device transmits the display control command to the display device through the USB-C interface.

14. The display control system of claim 13, wherein the smart device transmits the display control command to the display device through a data channel including differential signal pair.

15. A smart device, comprising:

an input/output (I/O) interface controller configured to receive a first control command from a remote control device;

a processor configured to convert the first control command to a first display control command and to transmit the first display control command to a display device, thereby adjusting a display parameter of the display device accordingly; and a first connector physically connected to a second connector of the display device;

wherein the smart device is a digital video converting box with internet networking capabilities, wherein the digital video converting box is a STB.

16. The smart device of claim 15, wherein the first connector includes an HDMI, wherein the smart device transmits the first display control command to the display device through the HDMI and a DDC and in compliance with a VESA MCCS standard.

17. The smart device of claim 15, further comprising:

a network interface controller configured to receive a Wake-on-LAN (WOL) packet from an external network;

wherein when the smart device is in a sleep mode and the network interface controller receives the WOL packet, the smart device enters an operation mode from the sleep mode.

18. The smart device of claim 15, further comprising:

a network interface controller configured to receive a WOL packet from an external network;

wherein when the display device is in a sleep mode and the network interface controller receives the WOL packet, the smart device transmits a Wake-on-LAN (WOL) signal to the display device, such that the display device enters an operation mode from the sleep mode.

19. The smart device of claim 15, wherein the I/O interface controller is further configured to receive a second control command from the remote control device, wherein the processor is further configured to convert the second control command to a second display control command and to transmit the second display control command to the display device, thereby switching an input signal source of the display device to be from the second connector or a third connector of the display device.

20. The smart device of claim 19, wherein the smart device transmits the second display control command to the display device in compliance with a VESA MCCS standard or a Consumer Electronics Control (CEC) protocol.

*  *  *  *  *